July 8, 1947.    E. B. DENNIE    2,423,441
CONTAINER HANDLING APPARATUS
Filed Aug. 11, 1945    2 Sheets-Sheet 1

INVENTOR.
Edward B. Dennie
BY
Alfred W. Knight
ATTORNEY

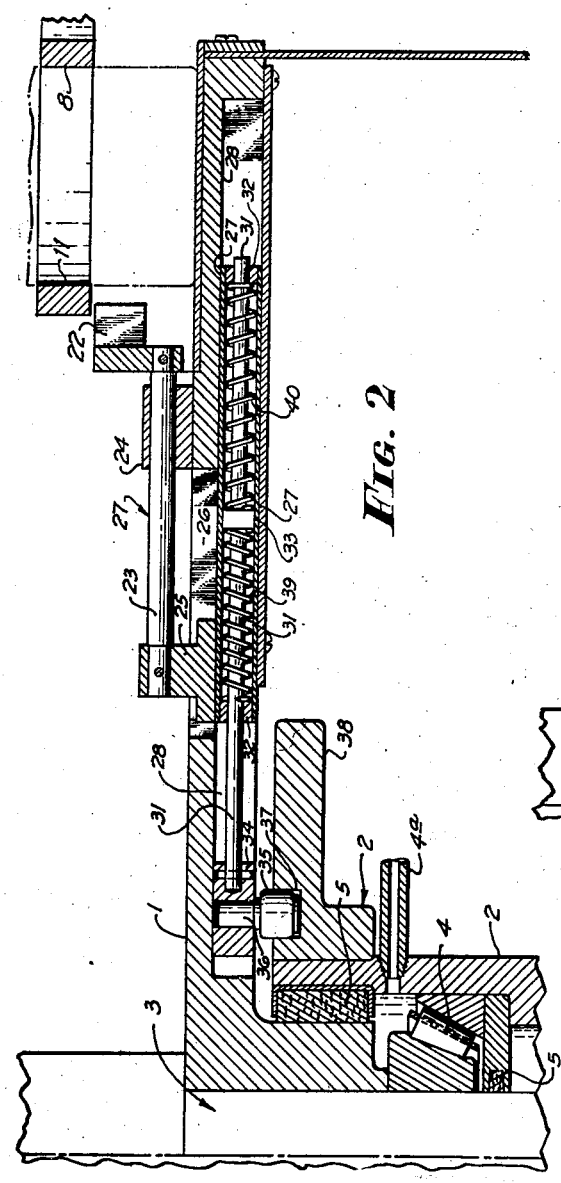
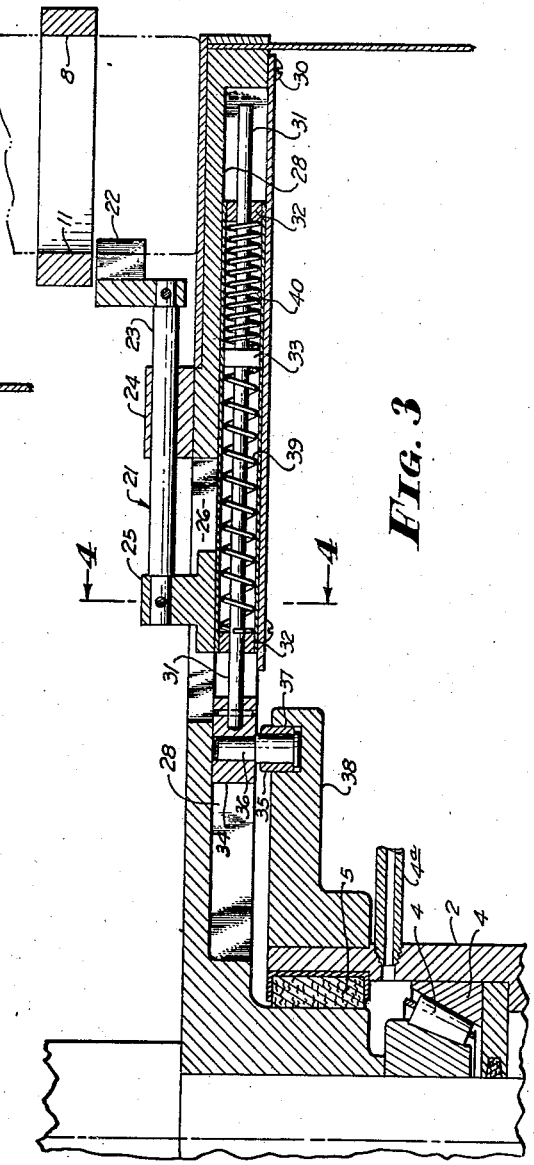

Patented July 8, 1947

2,423,441

UNITED STATES PATENT OFFICE 2,423,441

CONTAINER HANDLING APPARATUS

Edward B. Dennie, North Hollywood, Calif.

Application August 11, 1945, Serial No. 610,316

9 Claims. (Cl. 198—22)

This application relates to container handling apparatus such as is employed for filling, capping, sealing or like operations on cans, bottles or comparable containers. The invention pertains particularly to the handling mechanism whereby the containers are brought into proper position for such filling, sealing or other operation and subsequently discharged from the apparatus after completion of such operation.

One of the particular objects of the invention is to provide a container handling device having a rotating table or "dial" upon which containers are to be disposed during the filling, sealing or other operation, together with guide means for directing the containers from an associated supply conveyor or the like on to the rotating dial and for moving them into a desired spaced relation at peripherally distributed stations on said dial.

A further object of the invention is to provide a device of the character described incorporating guide means for directing the containers from the associated supply conveyors on to the rotating dial, together with spacing means adapted to receive successive containers in diametral contact with each other at a position spaced inwardly in a radial direction from the desired station position and to engage such containers successively and move the same outwardly upon the rotating table or dial to the desired station position and at the same time separate such containers so that they are no longer in the aforesaid diametral contact with one another.

A further object of the invention is to provide a device incorporating the objects immediately set forth above, in which the means for engaging the containers and providing the desired spaced separation thereof at the respective station positions is adapted also to eject the containers outwardly from such station positions upon completion of the desired filling, sealing or other operation, together with guide means adapted to receive such ejected containers and convey the same in diametral contact with one another toward an adjacent discharge conveyor.

A further object of the invention is to provide an apparatus of the character set forth above, in which the means for engaging the containers on the rotating table or dial is adapted to provide a resilient or yielding engagement with such containers. A further object is to provide a structure of the character described in which the container engaging means associated with the rotating table is adapted to perform equivalently upon containers of different diametral dimensions, in cooperation with adjustable guide means for delivery of such containers upon the rotating table or dial, whereby a given apparatus may be employed to handle different types or categories of containers.

In container handling apparatus of the type with which the present invention is generally concerned, it has been the more usual practice heretofore to provide a "star" wheel arrangement for receiving the containers and distributing the same upon the rotating table or dial upon which a given operation is to be performed, i. e., a distributing member ancillary to the feeding conveyor and the container dial is necessary to effect the proper distribution of the containers upon such dial. Furthermore, it is the usual requirement that different sizes of star wheels or other guiding means be employed for handling bottles of differing diameter, to effect the desired circumferential spacing of the containers upon the dial as well as the desired radial spacing of such containers from the center of rotation of the dial, in order that the handling operation such as filling, sealing or the like may be effective. According to my invention the means for spacing the successive containers upon the rotating dial is incorporated in the dial itself, and power driven ancillary feeding and distributing apparatus for directing the bottles or other containers from a moving conveyor to proper spaced positions on the dial are eliminated.

The apparatus of the present invention may comprise generally, a dial member adapted for rotation in a generally horizontal plane, upon which a plurality of containers are to be established for the performance of a given operation such as sealing, filling or the like, together with guide means fixed relative to the support for the rotating dial and serving to define a receiving zone on the periphery of the dial in a defined adjacency to a container supply-conveyor associated with such dial, such guide means being adapted to receive a plurality of containers delivered into contact therewith in succession and to successively deliver such containers in diametral contact with one another to a position within said receiving zone on said dial which is preferably spaced radially inward from the periphery of the dial and inwardly of the desired station on such dial at which a container is to be disposed for such aforesaid operation, such as filling or the like. The dial is provided with a plurality of angularly spaced container-spacing members mounted thereon for inward and outward movement in a radial direction, each of such container-spacing members being provided at its outer end with a container-engaging portion; means are provided for constraining such members to a position such as to locate the container-engaging portion thereof inwardly from the periphery of the dial an amount in excess of the diameter of the supply container when the respective container-spacing members are rotatively located adjacent such receiving zone, and for moving the members radially outward into engagement with the container delivered to said position in said receiving zone during rotation of the dial through a given angle, to cause the engaged container to be moved outwardly to a given peripheral position or station on said dial. The angular spacing of the container-spacing members on the dial will be so established as to cause adjacent containers located in the given peripheral positions or stations above mentioned to be spaced out of diametral contact with one another. The apparatus preferably also includes means for discharging the containers from the dial after completion of the aforesaid operation, in which the container-spacing members are adapted for outward movement in a radial direction to engage and move the associated container outwardly into engagement with guide means cooperating with a discharge conveyor, after which the container-spacing members are retracted to a radially inward position for the reception of a new container after completion of one full rotation of the dial, in successive repetitions of the handling operation.

The above and other features in the invention will be more specifically brought out, or will be apparent from the ensuing description of a specific embodiment of the invention as illustrated in the accompanying drawings, in which:

Fig. 2 is a sectional detail thereof as taken on line 2—2 in Fig. 1;

Fig. 3 is a sectional detail thereof as taken on line 3—3 in Fig. 1;

Figure 1:
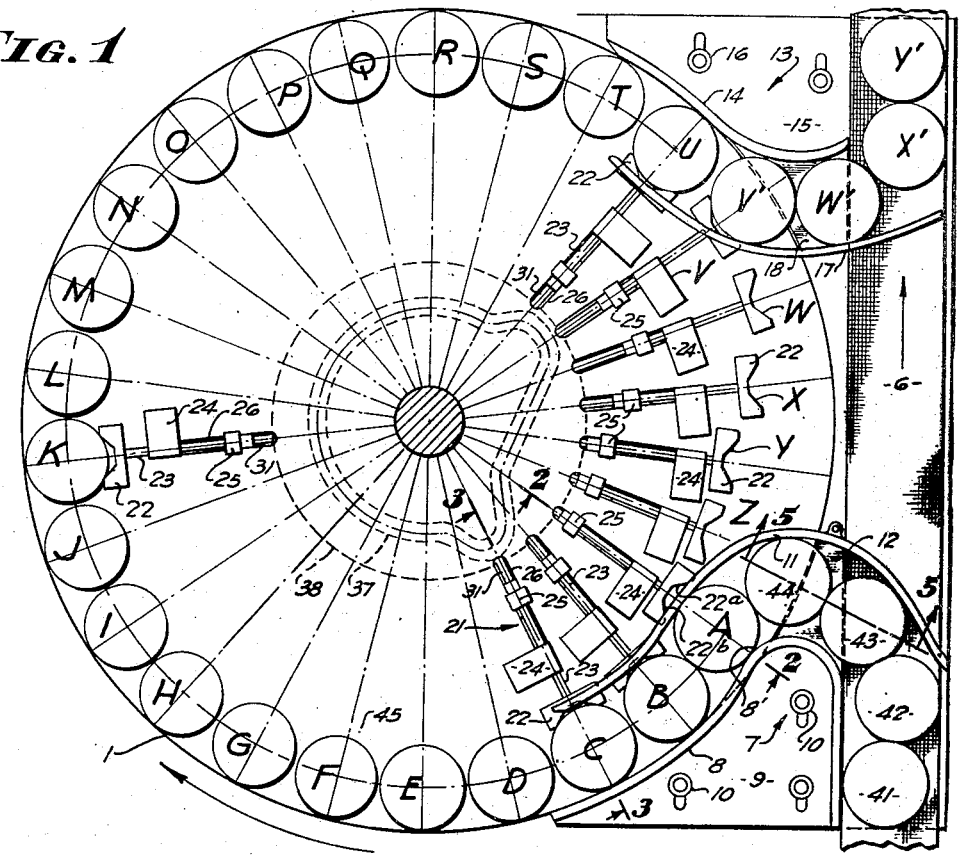
Fig. 1 is a partly broken away plan view of the container handling mechanism, including the rotating dial, the supply conveyor and the associated guide means.
Figure 4:
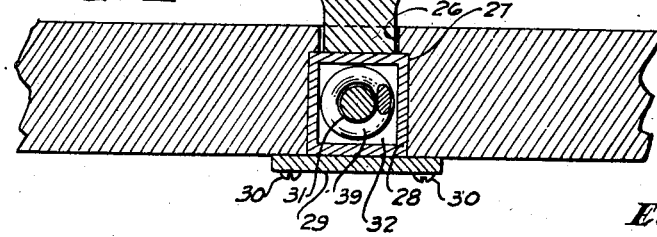
Fig. 4 is a transverse view as taken on line 4—4 in Fig. 2.
Figure 5:
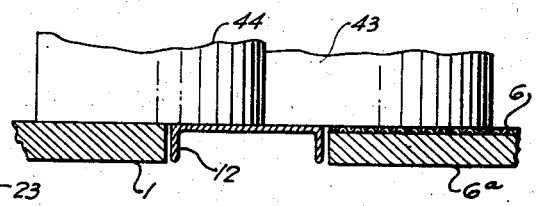
Fig. 5 is a sectional detail as taken on line 5—5 in Fig. 1.

Referring to the drawings, the apparatus may comprise a rotating dial 1 carried by a support construction 2 and provided with a drive shaft 3 which may be carried on support 2 through the agency of a supporting bearing 4 provided with a lubricant supply line 4a and sealing rings 5 for retention of the lubricant. A conveyor belt 6 is provided along one edge of the dial 1, supported by a suitable plate or the like 6a so as to locate the conveyor belt generally in a plane coinciding with the plane of the dial 1. A feeding guide is provided as indicated at 7, comprising an outer rail 8 mounted on an adjusting plate 9 anchored to the support through the agency of hold-down screws 10, and an inner guide rail 11, the outer guide rail extending from adjacent the edge of the conveyor 6 which is closest to the dial 1 to the outer periphery of the dial, and the rail 11 extending from the outer edge of the conveyor belt 6 across the periphery of the dial 1 to a desired inward position. A fixed table member 12 is provided to bridge the gap between the conveyor 6 and the adjacent edge of the dial 1, the table portion 12 being preferably disposed in the plane of the conveyor belt and the dial. At a point removed from the feeding guide 7 provide a discharge guide 13 comprising an outer rail 14 corresponding to the rail 8 above, and mounted on an adjusting plate 15 held down with screws 16, together with an inner discharge rail 17 corresponding to the rail 11, and a fixed table portion 18 corresponding to the portion 12.

As illustrated, the dial is intended to provide twenty-six stations at the periphery, i. e., a plurality of stations spaced apart one-twenty-sixth of the periphery of the dial. A container-spacing device is provided at each of the twenty-six stations, as indicated generally by the numeral 21, and each comprising a container-engaging portion 22 mounted on an actuating rod 23 slidably disposed in a bearing 24 secured to the dial, and provided at its inner end with a driving head 25 extending through a rectangular slot 26 in the dial and secured to a square cross-section guide 27 carried in a square slot 28 disposed radially within the body of the dial. The slot 28 is conveniently formed as open at the bottom side of the dial and a suitable cover plate 29, retained in place by means of screws or the like 30, is provided to close the slot 28 and thus define a guide for the member 27. An actuating rod 31 is provided for the driving head 25 and member 27, said rod being slidably extended through journals or guides 32 at the respective ends of the member 27 and carrying a cross-head 33 between the guides 32, the cross-head 33 being slidably disposed within the member 27. A driving head 34 is provided for the actuating rod 31, provided with a guiding roller 35 carried by pin 36 mounted on the head 34, said roller being coactingly disposed within a cam slot 37 provided on a cam disc 38 carried by the support 2. Within the member 27 and between the innermost guide 32 and the cross-head 33 I provide a retracting spring 39, and between the cross-head 33 and the outer guide 32, I provide an advancing spring 40 whereby the driving head 25, actuating rod 23 and container-engaging portion 22 of the container-spacing member 21 are adapted for a yielding engagement with the container when moving the same into its station on the dial 1. The function of the retracting spring 39 is primarily that of providing a yielding return for the container engaging portion 22 so that in the event a portion of a broken container happens to wedge between the inner side of the portion 22 and the bearing 24, the cam 37 may return the assembly 35—34—31. etc., without undue loads being imposed upon the structure.

The several stations for the containers on the dial 1, starting with the first station at which a container may be considered to be fully disposed upon the dial, I have designated by the letters A through U, the station U representing the last station in which a container is fully positioned on the dial prior to discharge. The stations V, W, X, Y and Z are not intended to be occupied by a container during operation of the device, and represent positions for the container-spacing members between the discharge and feeding sections of the construction.

The containers are intended to be supplied to the periphery of the dial by the movement of the conveyor 6 in the direction indicated by the arrow, such containers being indicated by the numerals 41, 42, 43 and 44 as the containers are brought on to the surface of the dial. As the containers reach the outermost portion of the inner guide member 11 they are crowded toward the dial by the pressure of the series of containers as produced by the conveyor movement, causing the containers to be distributed along the guide 11 in diametral contact with one another. The container 44 is shown as having passed nearly off of the fixed table portion 12 and is approaching a condition where it is to be wholly supported by the surface of the dial 1. In this position the container 44 is in diametral contact with the next forward container which is located approximately at the station A, and it will be observed that the outer guide member 8 is so shaped as to cause the container A to be disposed inwardly of the edge of the periphery of the dial, said container being crowded forwardly into diametral engagement with the container at station B.

The fixed cam disc 38 is provided with a cam 37 which is so shaped as to retract the container engaging portion 22 of the container-spacing member located at station A to an amount sufficient to cause the portion 22 to be clear of the container at A. After the dial 1 is rotated in a clockwise direction so that the container-spacing member shown at station A is moved toward the position of the container-spacing member indicated at the station B, the container engaging portion 22 thereof is moved outwardly into yielding engagement with the container and the oppositely directed V faces 22a and 22b are brought into engagement with the container (as indicated at station B), forcing the same outwardly against the outer guide member 8 while constraining the container to an angular spacing equivalent to the angular spacing of the adjacent container spacing members 21, such spacing being so selected that when the containers are located in the respective stations C through U, i. e., with the centers of the containers located along the dot dash circle 45 in Fig. 1, such containers will be spaced peripherally an amount slightly greater than the maximum diameter of the container, so as to provide a space therebetween. This provides a rather precise location of the centers of the containers for the filling, capping, sealing, or other operation which is to be conducted on the dial 1 between the stations E through S, for example. Radially outward pressure on the container-spacing member 21 as provided through the cam slot 37 is maintained until the container has been moved into station C to assist in the precise placement of the container on the periphery of the dial, by which time the filling, sealing or other means (not shown) will engage the container for the desired operation to be conducted, and further rotation of the dial 1 may be caused to effect a retraction of the container-spacing members to an inward position in which the container-engaging portions 22 are pulled out of contact with the containers in case the device is employed in a container filling operation, such inward position being conveniently the same within stations E through T, for example, and being illustrated by the full line designation of the member 21 at the station K. The positioning of the member 21 between stations E through T being identical, the showing thereof at these stations with the exception of station K has been omitted for simplification of the drawing.

As the containers pass through stations E through T the above described desired filling, sealing or other operation is conducted thereupon through operating members centered about the centers of the stations designated. The type of operating members employed will depend upon the character of the operation contemplated and the showing thereof is not considered essential to description of this invention.

As the containers approach the station U, adjacent the discharge portion of the device, the cam 37 is extended outwardly, returning the container-engagement portion into engagement with the adjacent container. The cam slot 37 is shaped to extend further radially as the dial 1 is rotated, moving the container-engaging portion 22 to a maximum outward position at approximately the station designated at V, urging the container indicated at V' towards the edge of the dial and on to the adjacent fixed table portion 18. At this position the container engaging portion 22 of the member 21 will tend to pull rotatively away from the container, urging the latter outwardly towards the position of the container indicated at W'. The successive pressure from the container indicated at U when it is moved toward the position of the container indicated at V' carries the containers as indicated at V', W', X', and Y' into diametral contact with one another and upon the conveyor 6 where they are withdrawn from adjacent the dial 1. As the dial 1 is rotated, the container-spacing members 21 at the positions indicated at V through W and X, Y and to the position Z, the cam slot 37 causes a retraction of the container-engaging portion 22 to the inward position referred to above in connection with the description of station A, whereupon the individual container-spacing members are repositioned for a repetition of the operating cycle.

The requirement that the containers on the dial 1 be spaced from one another within the stations C through T, for example, is dictated by the fact that most containers, particularly bottles, are found to vary in diameter a small amount, wherefore the containers are necessarily spaced from one another an amount such that when two over-sized containers are in adjacent stations there is at least a slight space therebetween. This enables the placement of the filling, sealing or like apparatus associated with the dial at specifically spaced peripheral positions about the dial, i. e., positions corresponding to the spaced stations as indicated in Fig. 1, at A through Z. The outer rail 8 of the feeding guide means is preferably adjusted so that the innermost portion thereof 8' causes the containers to be moved inwardly of the periphery of the dial an amount sufficient to accommodate for the variation in container-diameter which obtains in a given situation.

Minor modifications in the invention will occur to those skilled in the art, wherefore I do not consider my invention as limited to the precise details of construction herein delineated and described, but rather to the scope of the subjoined claims.

I claim:

1. A container handling device which comprises: a dial adapted for rotation in a generally horizontal plane; a support for said dial; guide means fixed relative to said support and defining a receiving zone on the upper surface of the periphery of said dial, said guide means being adapted to receive a plurality of containers delivered into contact therewith in succession and deliver the same in diametral contact with one another to a position within said receiving zone; a plurality of angularly spaced container-spacing members mounted on said dial for inward and outward movement in a radial direction, each of said members being provided at its outer end with a container-engaging portion; means constraining said members to a position such as to locate the container-engaging portion thereof inwardly from the periphery of said dial an amount in excess of the diameter of a supplied container when the respective members are located opposite said receiving zone, and for moving said members radially outwardly into engagement with a container delivered to said position within said receiving zone during further rotation of said dial through a given angle; guide means disposed adjacent the periphery of said dial and fixed with respect to said support, said members being adapted to engage such a container and force the same outwardly against said last-named guide means during such outward movement of said members, to position said containers at a given radial position, the angular spacing of said members on said dial being such as to cause adjacent containers located at said given radial positions to be spaced out of diametral contact with one another.

2. A construction as set forth in claim 1, and comprising in addition, spring means interposed between the container-engaging portions of said container-spacing members and said means for constraining and moving said members, whereby a yielding engagement of said containers is effected by said container-engaging portions.

3. A container-handling device which comprises: a dial adapted for rotation in a generally horizontal plane; a support for said dial; guide means fixed relative to said support and defining a receiving zone on the periphery of said dial, said guide means being adapted to receive a plurality of containers delivered into contact therewith in succession and successively deliver the same in diametral contact with another to a position within said receiving zone spaced radially inward from the periphery of said dial; a plurality of angularly spaced container-spacing members mounted on said dial for inward and outward movement in a radial direction, each of said members being provided at its outer end with a container-engaging portion; means constraining said members to a position such as to locate the container-engaging portion thereof inwardly from the periphery of said dial in amount in excess of the diameter of a supplied container when the respective members are rotatively located adjacent said receiving zone, and for moving said members radially outward into engagement with a container delivered to said position in said receiving zone during further rotation of said dial through a given angle, to cause such engaged container to be moved outwardly to a given peripheral position on said dial, the angular spacing of said members on said dial being such as to cause adjacent containers located in said given peripheral positions to be spaced out of diametral contact wtih one another.

4. A container-handling device which comprises: a dial adapted for rotation in a generally horizontal plane; conveyor means located adjacent the periphery of said dial; guide means defining a container-receiving zone adjacent said conveyor means, said guide means being adapted to deliver said containers to said dial in diametral contact with one another under translatory motivation provided by said conveyor means; a plurality of angularly spaced container-spacing members mounted on said dial for inward and outward movement in a radial direction, each of said members being provided at its outer end with a container-engaging portion; means for positioning said members in given radial positions and for moving said members outwardly from a first innermost position locating the container-engaging portion inwardly from the periphery of said dial an amount in excess of the diameter of a supplied container when said member is located at a rotative position to receive a container delivered to said dial by said guide means to a second outward position such as to engage a received container and move the same outwardly to a given peripheral location on said dial upon rotation thereof through a given angular movement, said given peripheral location being at a greater radial distance from the center of rotation of said dial than the location of said container when delivered to said dial by said guide means, and the angular spacing of said members on said dial being such as to cause adjacent containers located in said given peripheral positions to be spaced out of diametral contact with one another.

5. A container-handling device as set forth in claim 3, and comprising in addition: spring means interposed between the container-engaging portions of said container-spacing members and said means for constraining and moving said container-spacing members, whereby a yielding engagement of said containers is effected by said container-engaging portions.

6. A container-handling device as set forth in claim 3, said last-named means including means for moving said container-spacing members inwardly out of engagement with said containers upon further rotation of said dial through a given angle.

7. A container-handling device as set forth in claim 3, said last-named means including means for moving said container-spacing members inwardly out of engagement with said containers upon further rotation of said dial through a given angle, and for moving said container-spacing members outwardly into engagement with said containers upon a still further rotation of said dial to cause an outward movement of said containers to a position beyond said given peripheral location.

8. A container-handling device as set forth in claim 3, said last-named means including means for moving said container-spacing members inwardly out of engagement with said containers upon further rotation of said dial through a given angle, and for moving said container-spacing members outwardly into engagement with said containers upon a still further rotation of said dial to cause an outward movement of said containers to a position beyond said given peripheral position, and for retracting said members to said constrained position upon completion of one rotation of said dial.

9. A container-handling device as set forth in claim 4, and comprising in addition: a second guide means located adjacent the periphery of said dial and defining a container-discharge zone adjacent said conveyor means in angularly spaced relation to said container-receiving zone, said second guide means having portions disposed inwardly of the periphery of said dial in position to engage containers advanced toward said container-discharge zone upon rotation of said dial and guide the same outwardly toward said conveyor means; and said means for moving said container-spacing members being adapted to cause the container-engaging portions thereof to move outwardly as the rotative movement of said dial causes the respective members to approach said container-discharge zone and to engage the respective containers and move the same to radially outward positions beyond said given peripheral position as said containers are advanced toward said second guide means upon further rotation of said dial, and for retracting said members to said first position upon completion of one rotation of said dial.

EDWARD B. DENNIE.